Sept. 8, 1953  T. J. ACHEE  2,651,525
ADJUSTABLE CURB HOPPER
Filed Aug. 27, 1951

Thomas J. Achee
INVENTOR.

Patented Sept. 8, 1953

2,651,525

UNITED STATES PATENT OFFICE 2,651,525

ADJUSTABLE CURB HOPPER

Thomas J. Achee, New Orleans, La.

Application August 27, 1951, Serial No. 243,769

2 Claims. (Cl. 280—5.32)

This invention relates to new and useful improvements in hand carts and the primary object of the present invention is to provide a hand cart that may be moved over curbs in a convenient manner.

Another important object of the present invention is to provide a hand cart having a vertically adjustable rear wheel construction, whereby the cart may be moved upwardly over curbs of various heights.

A further object of the present invention is to provide a hand cart of the aforementioned character involving a novel and improved rear wheel mounting that is quickly and readily adjustable to selectively raise and lower the wheels of the mount relative to the front wheels of the cart.

A still further aim of the present invention is to provide a hand cart that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
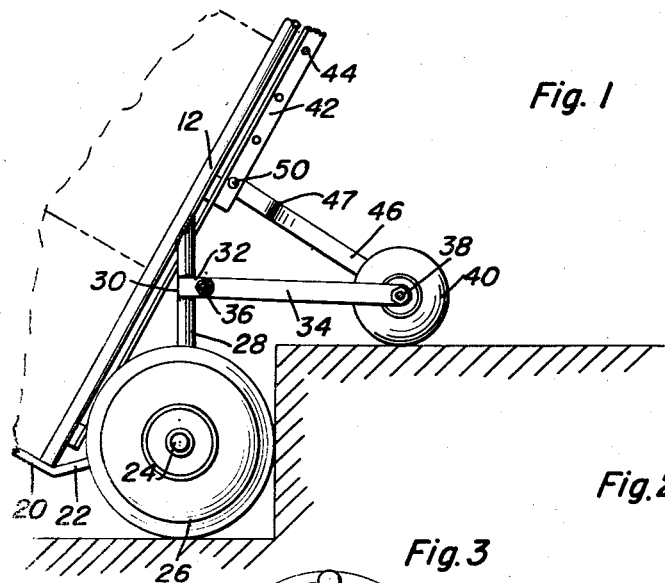
Figure 1 is a fragmentary side elevational view of the invention about to be moved over a curb.
Figure 2:
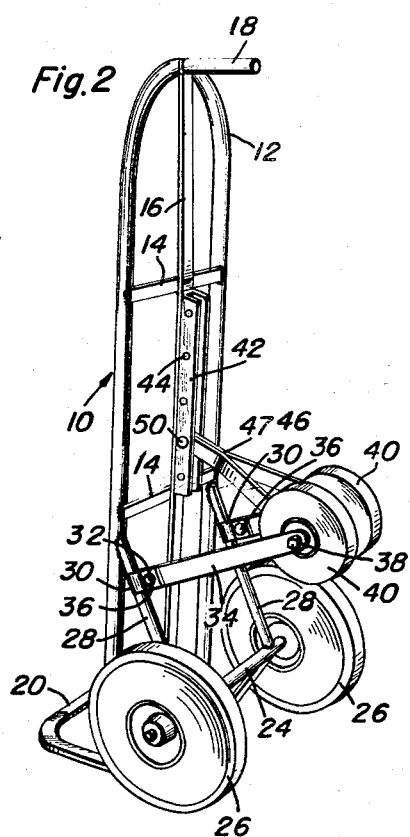
Figure 2 is a perspective view of the present invention.
Figure 3:
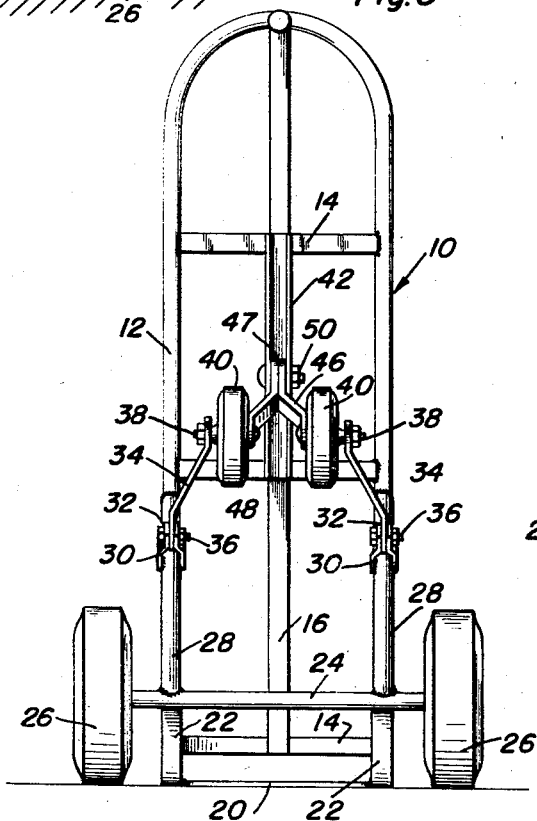
Figure 3 is a rear view of Figure 2.

Referring now to the drawings in detail, wherein for the purpose of illustration, there is disclosed a preferred embodiment of the present invention, the numeral 10 represents a frame including a U-shaped tubular member 12 whose leg portions are joined by cross-straps 14. The ends of the cross-straps are fixed by welding or the like to the leg portions of the member 12 and the central portions of the cross-straps 14 are fixed by welding or the like to a central longitudinal strap 16 whose upper end supports a laterally projecting hand grip 18.

A ledge forming member 20 is fixed to the ends of member 12 to retain articles on the frame 10. The member 20 is formed with rearwardly and upwardly inclined brace and support arms 22 that are fixed to a front axle 24 carrying wheels 26. The axle 24 is further supported and braced to the frame 10 by downwardly and rearwardly inclined arms 28.

A pair of anchor elements or plates 30 are fixed by welding or the like to each of the arms 28 and include rearwardly projecting ears 32 that are secured to the forward ends of links or pitmans 34 by pivots 36. The rear ends of the links 34 support the ends of a rear pair of axles 38 each of which carries a wheel 40.

A channel member 42 is fixed to the strap 16, medially the ends of the strap 16, and its flanges are provided with longitudinally spaced apertures 44 with the apertures in one flange registering with the apertures in the other flange.

The furcations of the bifurcated end 46 of a connecting member 47 each support an axle 38. The axles 38 are coaxial with respect to each other and their inner ends are fixed by welding or the like to the furcations. The furcations are spaced apart sufficiently to accommodate the leg of an operator especially during adjustment of the device. The other end of the member 47 is formed with an aperture for selectively registering with the apertures 44. A fastener 50 extends through the aperture in member 47 and the apertures 44 in registry with the aperture in member 47 to permit raising or lowering of the wheels 40 in accordance with the height of the curb over which the cart is to be moved.

In practical use of the invention, the wheels 40 are disposed over the curb to be employed as fulcrums to raise the lower end of the frame and the wheels 26 over the curb as shown in Figure 1.

Having described the invention, what is claimed as new is:

1. A hand cart comprising a frame, a front axle supported on the frame, brace means between the axle and the frame, a rear pair of coaxial axles, anchor elements fixed on the brace means, links terminally pivotally connected to said elements and to said rear axles, a channel fixed to the frame perpendicular to the axles, a connecting member having a bifurcated end carried by the rear axles and a straight portion adjustably secured to the channel, a rear wheel on each rear axle and forward wheels on the front axle.

2. A hand cart comprising a frame, a front axle supported on the frame, brace means between the axle and the frame, a rear pair of coaxial axles, anchor elements fixed on the brace means, links connecting said elements to said rear axles, a channel fixed to the frame perpendicular to the front and rear axles, said channel including spaced flanges having longitudinally spaced apertures therein with the apertures in one flange being in registry with the apertures in the other flange, a connecting member having a bifurcated end pivoted on the rear axles, fastening means carried by the other end of said connecting member and selectively received in said apertures, front wheels on the front axle, and a rear wheel on each of the rear axles.

THOMAS J. ACHEE.

References Cited in the file of this patent

UNITED STATES PATENTS

| Number | Name | Date |
|---|---|---|
| 672,152 | Ruher | Apr. 16, 1901 |
| 820,274 | Watley | May 8, 1906 |
| 1,735,527 | Cwik | Nov. 12, 1929 |

FOREIGN PATENTS

| Number | Country | Date |
|---|---|---|
| 266,260 | Switzerland | Jan. 15, 1950 |